W. HUMPHREYS.
FEED CONTROL FOR MILLERS.
APPLICATION FILED FEB. 16, 1917.
1,241,850.
Patented Oct. 2, 1917.
2 SHEETS—SHEET 2.
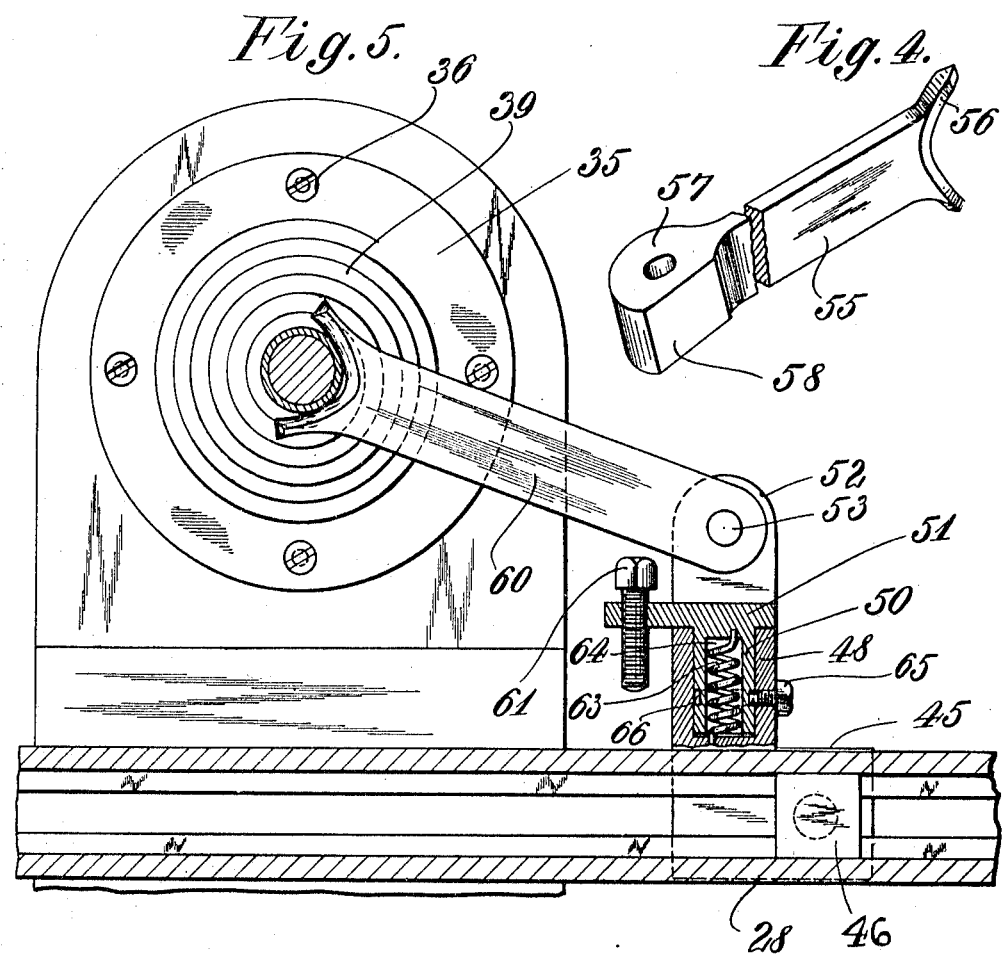
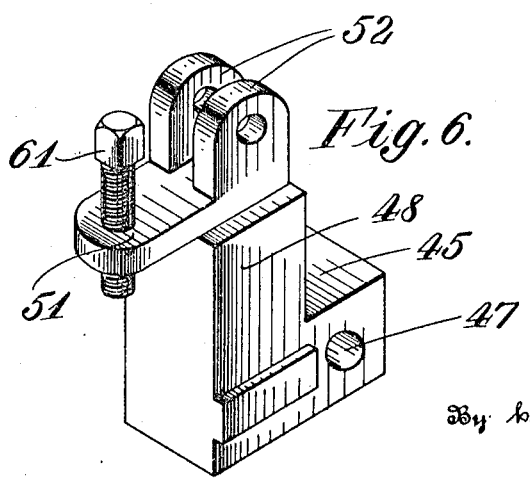
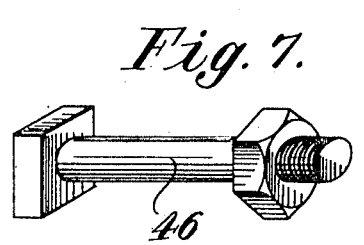
Inventor
William Humphreys
By his Attorney
Oscar Geier

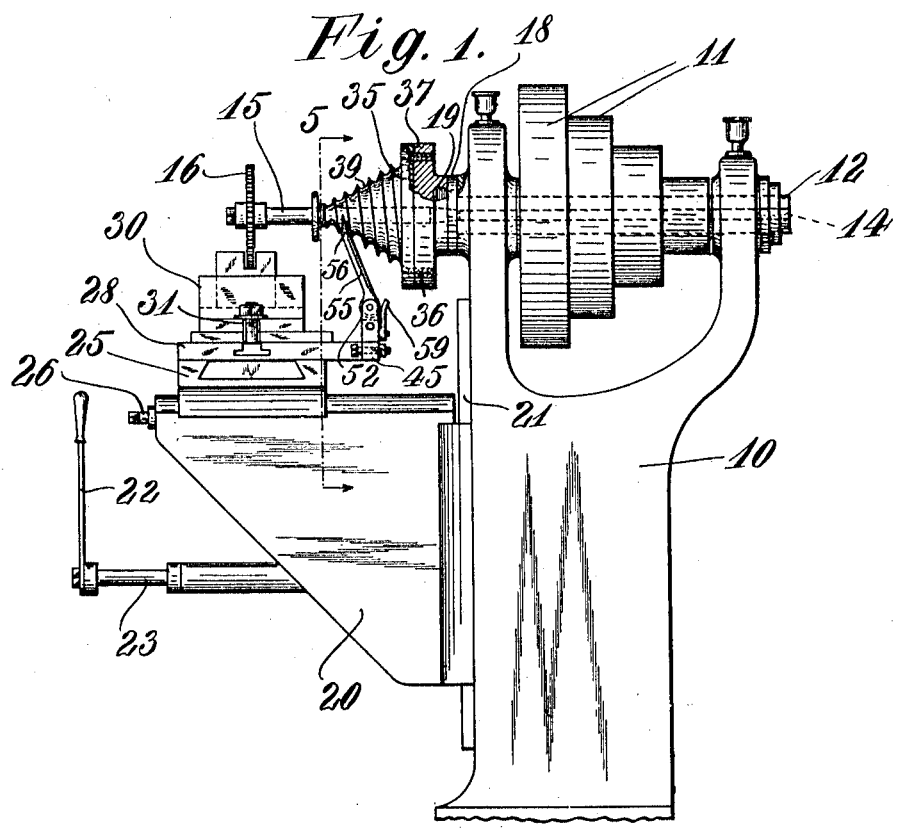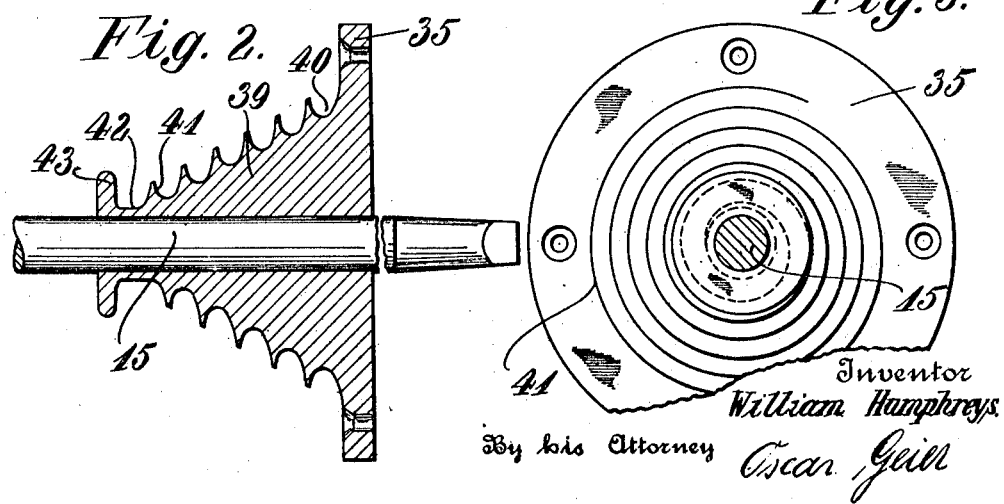

UNITED STATES PATENT OFFICE.

WILLIAM HUMPHREYS, OF NEW YORK, N. Y.

FEED CONTROL FOR MILLERS.

1,241,850.  Specification of Letters Patent.  Patented Oct. 2, 1917.

Application filed February 16, 1917. Serial No. 148,937.

*To all whom it may concern:*

Be it known that I, WILLIAM HUMPHREYS, a citizen of the United States, resident of New York, county of New York and State of New York, have invented certain new and useful Improvements in Feed Controls for Millers, of which the following is a specification.

This invention relates to improvements in feed controlling devices for hand milling machines, and has as its principal object the provision of means whereby the work, or part operated upon, is brought into contact with the cutter in such manner that the letter is not damaged thereby.

A further object is to provide such means in forms which may be readily applied to machines of ordinary construction in which the work platen or table is actuated by hand levers.

These and other like objects are attained by the novel design, construction and combination of parts hereafter described and shown in the accompanying drawings, forming a material part of this specification, and in which:—

Figure 1 is a partial side elevational view of a hand miller, showing the application of the invention.

Fig. 2 is an enlarged sectional view of the cutter spindle and feed control cone.

Fig. 3 is a front view of the same.

Fig. 4 is a perspective view showing the lever arm for making contact with the control cone.

Fig. 5 is a sectional view taken on line 5—5 of Fig. 1 and showing a modified construction.

Fig. 6 is a perspective view of the lever bracket, and

Fig. 7 is a perspective view of a clamp bolt employed.

Objections are frequently made to machines of this kind for the reason that unless the operator of the same is a careful experienced workman, the work is likely to come in contact with the cutter with such a shock as to break or damage the cutter, and also that the feed in cutting is seldom or never regular.

In order to avoid such disadvantages and to make a greater use of hand machines in which obviously the parts can be operated far more quickly than when screw feeds are employed, a novel device is herein shown and described.

In the figures, the numeral 10 indicates the body of the machine, which has a driving cone 11 mounted upon a spindle 12 through which is an opening 14 for driving out the arbor or cutter carrying spindle 15 shown to have engaged with it the cutter 16.

On the forward end of the main spindle is an enlarged thrust collar 18 having a screw threaded nose 19 immediately adjacent to which may be attached a face plate or chuck as desired.

At the front of the machine is a knee 20 adapted to be moved longitudinally of the vertical slide 21 by means of the handle 22, the same engaging with a shaft 23 communicating motion to a rack or other common feed device (not shown).

Upon the top of the knee is a saddle 25 movable to or from the body 10 by means of the screw 26, the saddle having slidably mounted therein the platen 28 upon which a work holding vise 30 may be rigidly secured by the bolts 31 in an ordinary manner.

Means for moving the platen or table 28 lengthwise are not shown but obviously may be of any well-known type controlled and operated by a handle, actuating a rack and pinion feed. Thus far the description may apply to any hand milling machine.

The invention comprises a face plate 35, secured by screws 36 or the like to the face plate 37, screw threaded to the nose 19 of the engaging spindle. The cutter arbor 15 extends through the face plate and a conical sleeve 39, the convolution of which begins at the largest diameter 40 terminating in a smaller diameter 41, after which the threads run off into an annular recess 42, terminated by the plate 43.

Attached to the platen 28 by means of the bolt 46 is an adjustable bracket 45, the bolt passing through an opening 47 in the end of the bracket and extending up from the bracket is a projection 48 bored to receive the stem 50 formed with a plate 51 having upon its upper surface a pair of lugs 52 acting as a fulcrum for the pin 53 upon which is the lever 55, the outer end of which is formed and suited to engage with the threads of the cone.

The hub end 57 of the lever is provided with a flat face 58 against which presses a spring 59, the same being adapted to throw the lever or arm over toward the right or face plate 35 when the platen is lowered.

The foregoing description applies only to millers in which the work is moved vertically, and in operation, the arm is so adjusted as to make contact with the largest diameter of the tube, as at 40, just prior to the contact of the cutter with the work, whereupon, as the machine spindle rotates, both cutter and cone rotate, causing the arm to move toward the cutter and in so doing permits of the platen carrying the work to be raised gradually so that the cutter touches the work in a proper manner and completes the cut with regularity.

In the adaptation shown in Figs. 5 and 6, devices are shown providing for feed control in a longitudinal direction. In this case, the same bracket 45 is employed, there being pivoted to the lugs 52 a different shaped lever arm 60, prevented from dropping down an undesirable extent by means of the stop screw 61, set in the plate 51, the plate turning upon the stem 50 as the arm 60 is moved by the cone 39, it being brought to a normal starting position by means of the coiled spiral spring 63 contained in a recess 64 formed in the stem 50, one end of the spring being firmly attached to the plate 51 and the other to a fixed part of the bracket 45, the spindle being held from raising out of the bracket by means of the set screw 65 operating in an annular slot 66 formed in the periphery of the stem 50.

In operation, the arrangement is very similar except that in place of the bracket being directly below the cutting point, it is preferably at one side thereof, the point of the lever engaging first with the large diameter 40 of the cone 39 and being brought toward the cutter as the work is advanced.

From the foregoing, it will be seen that a positive control is provided by means of which the work may be moved either in a vertical direction or in a longitudinal direction as desired, and without danger to the cutter.

Having thus described my invention, what I claim as new, and desire to secure by Letters Patent, is:—

1. The combination with a rotatable spindle, a cutter carried thereby, a work-holder, and means for advancing or receding said work-holder with respect to said cutter, of a cone engaged with said spindle, an arm pivotally carried by said work-holder engageable with said cone, and means for causing said arm to traverse the length of said cone.

2. In a milling machine, the combination with a spindle, cutter and table thereof, of a cone mounted on said spindle, a spiral helix formed on said cone, a bracket carried on said table, a pivoted lever arm operable in said bracket engageable with said spiral helix, and means for returning said lever arm to its initial position after traversing the length of said cone.

3. In a milling machine, the combination with a spindle, a cutter driven thereby, a work table, means for moving said work table rectilinearly, a bracket rigidly attached to said table, an arm pivoted in said bracket, said arm having a part extending outwardly, a cone rigidly attached to said spindle, said cone having a plurality of helical convolutions formed upon its exterior engageable with said arm, means for limiting the extreme motion of said arm, and means for returning said arm to its original position.

In testimony whereof I have affixed my signature this 12th day of February, 1917.

WILLIAM HUMPHREYS.

Copies of this patent may be obtained for five cents each, by addressing the "Commissioner of Patents, Washington, D. C."